March 20, 1962 H. J. ESSIG 3,026,082
CONTROL VALVE
Filed Sept. 29, 1959

INVENTOR
Henry J. Essig 3,026,082
CONTROL VALVE
Henry J. Essig, Westlake, Ohio, assignor to The West
Base Company, Westlake, Ohio
Filed Sept. 29, 1959, Ser. No. 843,259
3 Claims. (Cl. 251—14)

This invention relates to a control valve which allows to control the amount of flow or the pressure of the medium which passes the valve.

The invention finds particular application in control systems where the fluid to be controlled is extremely dangerous and where no leaks to the outside of the valve proper can be tolerated. Control systems of this kind referred to usually employ control valves where the stem which positions the valve plug in respect to the seat, is sealed off by elastic bellows which follows any movement of the stem. The use of elastic bellows in mechanism of this kind, however, has a number of disadvantages for which no satisfactory solution has heretofore been found. One such disadvantage is that bellows are suitable for use only at relatively low pressures. Another such disadvantage of mechanism of the bellow seal is that it has a larger effective area than the stem, which in turn may produce undesired forces, which can unbalance the control mechanism.

The present invention has for an important object the provision of a tube sealed valve actuating mechanism by which the above disadvantages may be overcome, which may be used throughout a wide range of different fluid pressures and temperatures, yet which does not change its position or its ability to actuate the valve plug during a control process.

Another object of the invention is the provision of a control valve having adjustable flow rate per given control signal by means of a lever mechanism which converts any control signal force in a selected ratio to the valve plug movement.

A further object of the invention is to provide a control valve for use in fluid systems, which is of compact design and simple construction, which is capable of delivering long trouble free service without attention.

The above and other important objects and advantages of the invention will best be understood from the following detailed description, constituting a specification of the same, when considered in conjunction with the annexed drawings, wherein—

Figure 1:
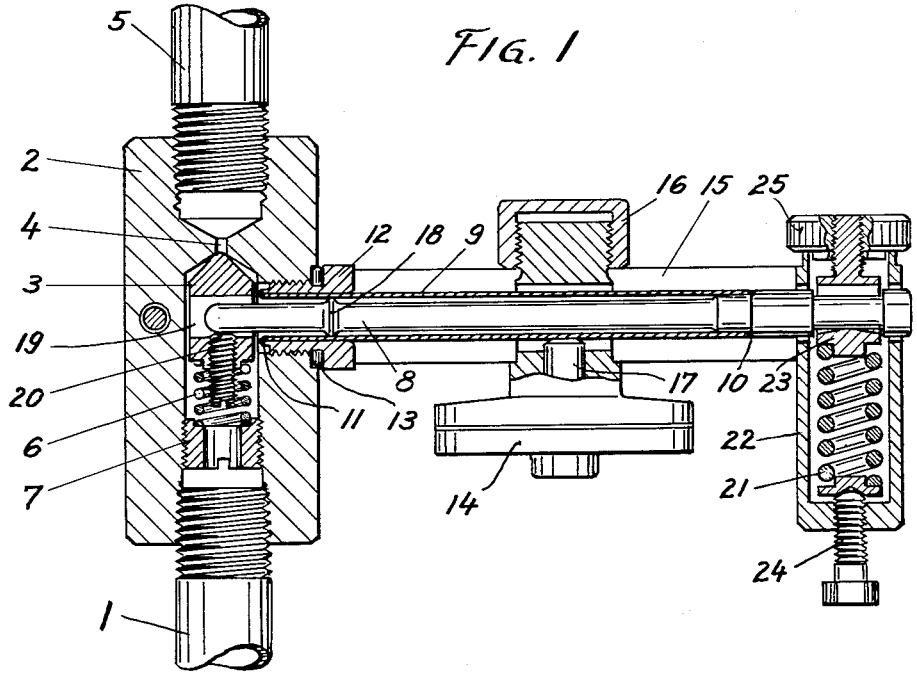
FIGURE 1 is a vertical, central, cross-sectional view, showing the structure and arrangement of parts of the control mechanism of the invention.
Figure 2:
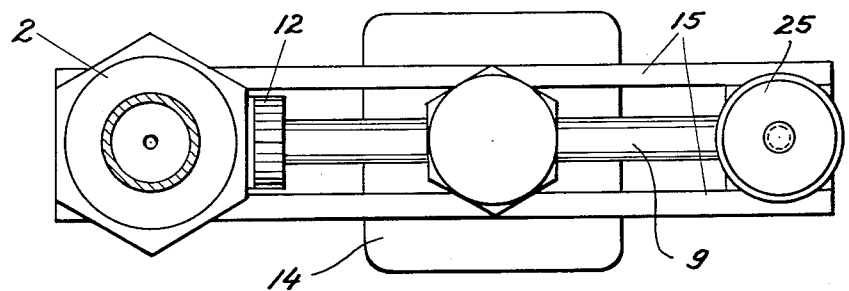
FIGURE 2 shows the invention from the top view.

Referring now to the drawings in greater detail, the invention is illustrated in connection with its application to a fluid system which includes a pipe-line indicated at 1, which delivers the fluid to be controlled into the valve housing, shown at 2. The fluid bypasses the valve plug, indicated at 3, and flows through an orifice at 4 to reach the downstream pipe, shown at 5. In the shut-off position of the control valve the plug 3 is pressed firmly against the valve seat 4 by a coiled spring, shown at 6, which is retained by a threaded insert, indicated at 7. A lever 8 is enclosed in a sealing tube, indicated at 9. This tube 9 is welded at 10 to the stem and at 11 to a fitting, indicated at 12. This fitting 12 is screwed into the valve housing 2 in a position perpendicular to the flow direction.

A gasket, which is placed at 13 between the fitting 12 and the housing 2, prevents together with the welds between the tube 9 and the lever 8 and between tube 9 and fitting 12 leakage of the fluid to the outside of the housing 2.

An actuating mechanism, shown at 14, responding to a given pneumatic or electric signal is located between two rails, shown at 15, which are permanently secured to the valve housing 2 and the bias spring housing 22 to form a firm support for the drive mechanism 14, so that it may slide within a given distance towards or away from the valve housing 2, in order to change the lever relationship between force output and valve lift. A locknut, indicated at 16, may secure a selected position of the actuating mechanism 14 by clamping the mechanism to its supporting rails 15.

This actuating mechanism 14 may consist of a pneumatic motor, a solenoid or a temperature sensitive bellows arrangement and provides a force output in response to a given control signal sufficient enough to deflect the lever 8 together with its sealing tube 9 over its longitudinal axis by means of an actuator stem, shown at 17. This deflection turns the lever 8 around its fulcrum, shown at 18, inside the tube 9. A portion of the lever 8 is extended through a horizontally drilled hole, shown at 19, inside the valve plug 3, where it rests against an adjustable setscrew as indicated at 20. This portion of the lever 8 turning around the fulcrum 18 in opposite direction of the deflecting tube 9 lifts the valve plug 3 away from the valve seat 4 thus providing a flow passage for the fluid. The tension within the tube 9, while deflected, together with the force of the compressed coiled spring 6, serves to return the lever 8 to its original position and to close the valve, once the force created by the actuating mechanism 14 is removed. Assuming a constant force output of the actuating mechanism 14, the deflection of the lever 8 and therefore the flow through the valve is larger if the actuating mechanism 14 is clamped between the rails 15 at a position away from the fulcrum 18. If the actuating mechanism 14 is mounted at a position near the fulcrum 18, then the deflection of the lever 8 is less since the stiffness of its sealing tube 9 is increased. The adjustment of the actuating mechanism 14 between its supporting rails 15 in its relative distance to the fulcrum 18 provides therefore an effective means of changing the desired flow output of the valve.

A bias spring, shown at 21, retained in a spring housing 22 may serve to support the action of the actuating mechanism 14 or to predeflect the lever 8 to a given position. The force of this spring 21, which in turn is submitted to the lever 8 by means of a pivot, shown at 23, may be increased or decreased by turning an adjusting screw, indicated at 24, which changes the amount of spring compression. A handwheel, shown at 25, which is secrewed on the pivot 23, may serve as a means to operate the control valve manually. Turning the handwheel 25, which is resting on the spring housing 22, forces the pivot 23 to follow its threaded section and deflect in turn the lever 8.

The invention has been disclosed in connection with a specific embodiment of the same, but it will be understood that this is intended by way of illustration only and that numerous changes can be made in the construction and arrangement of the various parts without departing from the spirit of the invention or the scope of the appended claims.

Having thus clearly shown and described the invention, what is claimed as new and desired to secure by Letters Patent is:

1. A control valve which comprises a valve housing having an opening in the side wall thereof, a valve seat and valve body within said housing, said valve body being provided with a side opening, a coil spring situated within said housing and bearing upon the valve body to force the same against the valve seat, a lever positioned to engage the side opening of the valve body and extending substantially perpendicular therefrom through the side opening in the valve housing, said lever being of predetermined length and having a terminating end disposed externally of the valve housing, said lever interacting with the valve body to lift and lower the same in respect to the valve seat, a fulcrum provided for said lever, a flexible tubing extending outwardly from the valve housing to accommodate the lever and fulcrum, said flexible tubing being permanently secured to the valve housing and to the lever to form a cantilever spring, sealing means provided for the side of said housing to prevent escape of fluid therefrom, and means for applying force to the lever and means for effectively changing the resiliency of said cantilever spring which includes supporting rails secured perpendicularly to the valve housing, means for applying force to said cantilever spring supported by and on said rails and means for adjusting the position of said force applying means with respect to the valve housing on and along said rails.

2. A control valve which comprises a valve housing having an opening in the side wall thereof, a valve seat and valve body within said housing, said valve body being provided with a side opening, a coil spring situated within said housing and bearing upon the valve body to force the same against the valve seat, a lever positioned to engage the side opening of the valve body and extending substantially perpendicular therefrom through the side opening of the housing, said lever being of predetermined length and having a terminating end disposed externally of the valve housing, an externally disposed spring housing situated substantially at the terminating end of said lever and enclosing a spring, means for communicating the force of said last mentioned spring to said lever, means for adjusting the force of said last mentioned spring to the lever, said lever interacting with the valve body to lift and lower the same in respect to the valve seat, a fulcrum provided for said lever, a flexible tubing extending outwardly from the valve housing to accommodate the lever and fulcrum, said flexible tubing being permanently secured to the valve housing and to the lever to form a cantilever spring, sealing means provided for the side of said housing to prevent escape of fluid therefrom, and additional means for applying force to the lever and means for controlling the amount of force applied to said lever by said additional means for lifting and lowering the valve body to selectively engaging or disengaging position with respect to the seat.

3. A control valve which comprises a valve housing having an opening in the side wall thereof, a valve seat and valve body within said housing, said valve body being provided with a side opening, a coil spring situated within said housing and bearing upon the valve body to force the same against the valve seat, a lever positioned to engage the side opening of the valve body and extending substantially perpendicular therefrom through the side opening of the housing, said lever being of predetermined length and having a terminating end disposed externally of the valve housing, an externally disposed spring housing situated substantially at the terminating end of said lever and enclosing a spring, means for communicating the force of said last mentioned spring to said lever, means for adjusting the force of said last mentioned spring to the lever, said lever interacting with the valve body to lift and lower the same in respect to the valve seat, a fulcrum provided for said lever, a flexible tubing extending outwardly from the valve housing to accommodate the lever and fulcrum, said flexible tubing being permanently secured to the valve housing and to the lever to form a cantilever spring, sealing means provided for the side of said housing to prevent escape of fluid therefrom, and additional means for applying force to the lever and means for effectively changing the resiliency of said cantilever spring which includes supporting rails secured perpendicularly to the valve housing, means for applying force to said cantilever spring supported by and on said rails and means for adjusting the position of said force applying means with respect to the valve housing on and along said rails.

References Cited in the file of this patent

UNITED STATES PATENTS

| | | |
|---|---|---|
| 202,982 | Bliss | Apr. 30, 1878 |
| 487,671 | Hunter | Dec. 6, 1892 |
| 1,255,389 | Cornelius | Feb. 5, 1918 |
| 1,327,156 | Hanes | Jan. 6, 1920 |
| 2,230,515 | Pieper | Feb. 4, 1941 |
| 2,457,320 | Rosenburger | Dec. 28, 1948 |
| 2,642,747 | Le Van | June 23, 1953 |
| 2,956,866 | Dick | Oct. 18, 1960 |

FOREIGN PATENTS

| | | |
|---|---|---|
| 68,608 | Switzerland | of 1915 |
| | (Addition of principal Patent 63,709 of 1913) | |
| 640,304 | France | of 1928 |